United States Patent
Reitterer et al.

(10) Patent No.: US 9,686,519 B2
(45) Date of Patent: Jun. 20, 2017

(54) APPARATUS FOR PROJECTING A PICTURE ELEMENT

(71) Applicant: TriLite Technologies GmbH, Vienna (AT)

(72) Inventors: Joerg Reitterer, Vienna (AT); Franz Fidler, Vienna (AT); Ferdinand Saint Julien-Wallsee, Vienna (AT)

(73) Assignee: TriLife Technologies GmbH, Vienna (AT)

( * ) Notice: Subject to any disclaimer, the term of this patent is extended or adjusted under 35 U.S.C. 154(b) by 0 days.

(21) Appl. No.: 15/018,901

(22) Filed: Feb. 9, 2016

(65) Prior Publication Data
US 2016/0234469 A1  Aug. 11, 2016

(30) Foreign Application Priority Data
Feb. 9, 2015 (EP) ..................................... 15154275

(51) Int. Cl.
*H04N 9/31* (2006.01)

(52) U.S. Cl.
CPC ........... *H04N 9/317* (2013.01); *H04N 9/3135* (2013.01); *H04N 9/3185* (2013.01)

(58) Field of Classification Search
CPC .. H04N 9/3129; H04N 9/3105; H04N 9/3194; H04N 9/3164; H04N 9/3185; H04N 3/08
See application file for complete search history.

(56) References Cited

U.S. PATENT DOCUMENTS

| | | | | |
|---|---|---|---|---|
| 2002/0140907 A1* | 10/2002 | Fujimori | ............ | G03B 21/005 353/31 |
| 2010/0315552 A1* | 12/2010 | Rothaar | ............ | G02B 26/085 348/512 |
| 2013/0162960 A1* | 6/2013 | Chikaoka | ............ | G02B 26/123 353/85 |
| 2014/0293236 A1 | 10/2014 | Nagashima et al. | | |

FOREIGN PATENT DOCUMENTS

| | | |
|---|---|---|
| JP | 2007140010 | 6/2007 |
| JP | 2011039326 | 2/2011 |

OTHER PUBLICATIONS

European Patent Office Search Report for Application No. 15154275.0-1903 dated Aug. 17, 2015.
European Patent Office Search Report for Application No. 15154275.0-1903 dated Dec. 7, 2015.

* cited by examiner

*Primary Examiner* — Michael Teitelbaum
(74) *Attorney, Agent, or Firm* — Hoffmann & Baron, LLP

(57) ABSTRACT

An apparatus for projecting a picture element based on at least a first and a second sample comprises a mirror configured to pivot about two axes, at least a first and a second light generation unit, and a processor being configured to output the first sample received at a first point in time at a second point in time to the first light generation unit and the second sample received at a first point in time at a third point in time to the second light generation unit. At least one of the second and third points in time is determined such that the distance between the actual first and second positions is reduced.

22 Claims, 8 Drawing Sheets

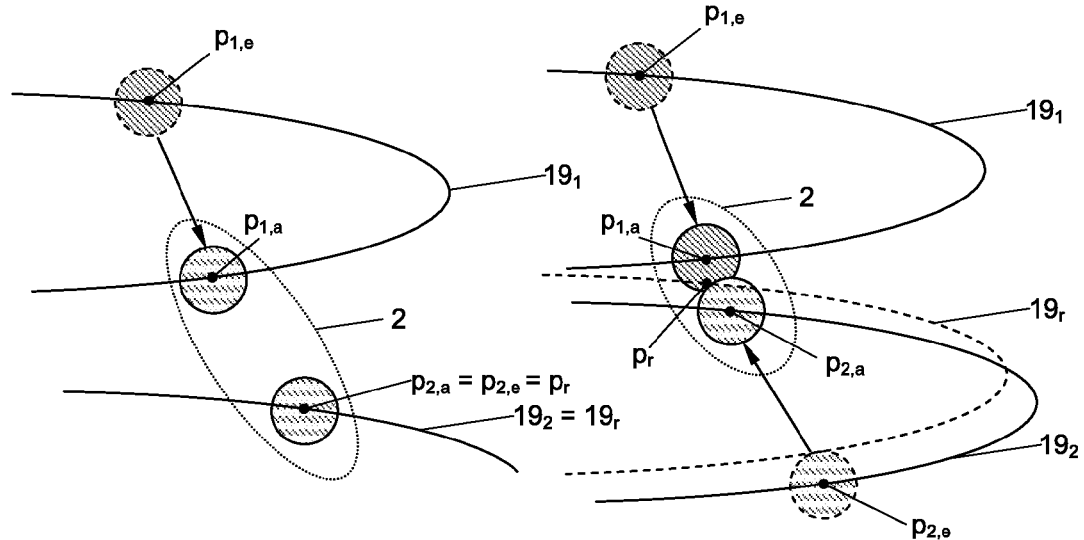
*Fig. 9*  *Fig. 10*
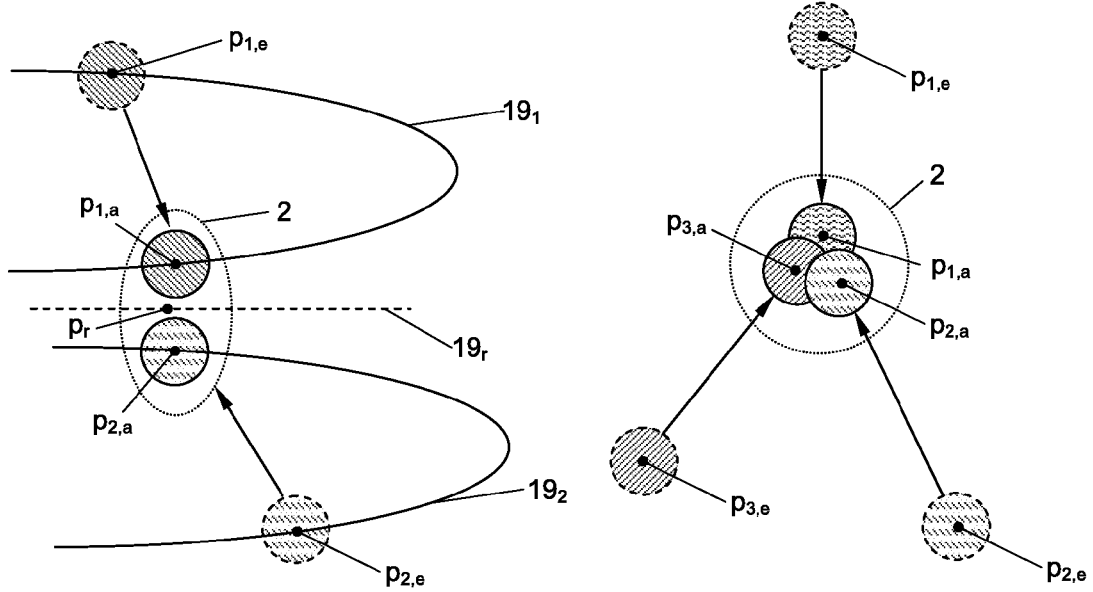
*Fig. 11*  *Fig. 12*

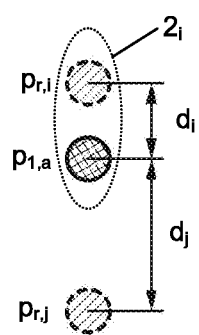
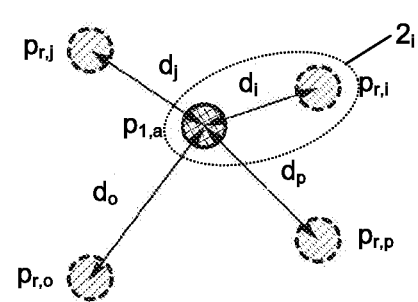
*Fig. 16*          *Fig. 17*

APPARATUS FOR PROJECTING A PICTURE ELEMENT

CROSS-REFERENCE TO RELATED APPLICATION(S)

This application claims priority to European Patent Application No. 15 154 275.0, filed Feb. 9, 2015, the disclosure of which is herein incorporated by reference in its entirety.

FIELD OF THE INVENTION

The present invention relates to an apparatus for projecting a picture element composed of at least a first component based on a first sample of a picture signal and a second component based on a second sample of the picture signal.

BACKGROUND

Mirror systems in the form of micro-electro-mechanical systems (MEMS) are known in the art as devices capable of pivoting a mirror around one or two axes at a high frequency, e.g., in order to deflect a light beam in a specific direction. This can be used for projectors which project light onto, e.g., a projection screen or directly into the human eye.

To project light in varying colors, it is known in the state of the art to collimate three light beams of different primary colors such as red, green, and blue, e.g., by means of beam combiners, in order to deflect the coaxial light beams which can then be regarded as a single light beam of varying color.

However, the light generation units, collimation optics, and beam combiners have to be aligned very carefully and precisely with respect to each other to achieve a perfect coaxial match of the beams since an adjustment after the assembly of the components is not possible. Thus, such multi-color projectors are complicated to manufacture, and a re-adjustment or calibration of the individual light generation units in case of mismatch is not possible.

SUMMARY

It is an object of the invention to provide for an improved apparatus for projecting a picture element which overcomes the above-mentioned drawbacks of the state of the art.

To this end, the invention provides for an apparatus for projecting a picture element composed of at least a first component based on a first sample of a picture signal and a second component based on a second sample of the picture signal, the apparatus comprising: a carrier, a mirror mounted on the carrier, being configured to pivot about two axes, and having a mirror period, at least a first and a second light generation unit, each light generation unit being mounted on the carrier, directed at the mirror, and having an input via which it can be controlled, and a processor having an input and a plurality of outputs, wherein each output is connected to one of the inputs of the light generation units, the processor being configured to receive, at its input, the first sample and the second sample at a first point in time within the mirror period, output the first sample at a second point in time within the same mirror period to the first light generation unit, at which second point in time the first light generation unit projects, via the pivoting mirror, the first component of the picture element onto an actual first position on a projection area, output the second sample at a third point in time within the same mirror period to the second light generation unit, at which third point in time the second light generation unit projects, via the pivoting mirror, the second component of the picture element onto an actual second position on the projection area, wherein at least one of the second and third points in time is determined such that the distance between the actual first and second positions is reduced.

Due to the movement of the mirror, each light generation unit projects a trajectory of its components of the picture elements onto the projection area, e.g., a projection plane. If the light generation units are mutually displaced and/or not calibrated, they each project trajectories which are mutually displaced, which leads to a picture of picture elements whose components, e.g., the color components, are offset from one another, i.e., un- or decalibrated. As an example, the "red" component can be at a small spatial distance on the projection screen from the "green" component of one and the same picture element, yielding an unclear, blurred picture. According to the invention, the components of at least one light generation unit are thus (re-)calibrated or shifted towards the components of another light generation unit.

Time-shifting all picture element components of at least one of the light generation units in that way, e.g., the "red", "green", and "blue" components towards each other by altering their output times, leads to a picture with locally better matching (color) components.

The invention thus provides for a projection apparatus which can be produced cheaply and efficiently since the light generation units do not have to be aligned in a hardware-based manner but can be calibrated by means of a software function or table providing said time-shifting of samples of the picture signal fed to the light generation units.

Optionally, said actual first and second positions are derived from a reference position lying on a reference trajectory. According to this embodiment of the invention, various ways of choosing a reference position or reference trajectory for said time-shifting of the samples are possible.

In a first embodiment, the reference trajectory, i.e., the reference positions, are predetermined. Thus, an arbitrary reference trajectory, e.g., an idealized reference trajectory of straight lines as a grid over the projection area, can be chosen.

In a second embodiment of the invention, the third point in time corresponds to the first point in time, and said actual first position is derived from the actual second position, i.e., the actual second position is the reference position. Thus, for example, the trajectory projected by one light generation unit, e.g., the "green" trajectory, is taken as a reference trajectory, and the "red" light generation unit is calibrated towards this "green" trajectory. This has the advantage that the samples fed to one of the light generation units need not be time-shifted since its trajectory serves as the reference trajectory.

In a third embodiment of the invention, said actual first and second positions are derived from both an estimated second position onto which the second light generation unit would project the second component of the picture element upon receiving the second sample at the first point in time at its input and from an estimated first position onto which the first light generation unit would project the first component of the picture element upon receiving the first sample at the first point in time at its input, i.e., the reference position can be, for example, a (weighted) mean position based on the estimated first and second position. Thus, a (optionally weighted median) reference trajectory, for example, can be chosen based on the trajectories of the first and the second light generation units, which means that, for example, the components of both the "red" and the "green" light generation units are time-shifted such that they meet "in the middle". This is especially favorable if there are three or more light generation units, such that their trajectories lie around the reference trajectory.

Optionally, the apparatus of the invention is capable of projecting full-color picture elements composed of three components of different primary colors, i.e., the picture element is composed of said first component, said second component, and a third component based on a third sample of the picture signal, and the apparatus comprises three light generation units corresponding to such different colors. Furthermore, the processor is further configured to output the third sample at a fourth point in time within the same mirror period to the third light generation unit, at which fourth point in time the third light generation unit projects, via the pivoting mirror, the third component of the picture element onto an actual third position on the projection area, wherein the fourth point in time is determined such that the distance between the actual first and third positions and the distance between the actual second and third positions are reduced.

Also in this three-color-component scenario, the reference trajectory can be chosen in different ways. In analogy to the first embodiment explained above for two colors, the first, second, and third positions can be derived from a reference position lying on a reference trajectory, e.g., an arbitrary chosen, predetermined reference trajectory.

In analogy to the second embodiment outlined above for two colors, the processor can alternatively be further configured to output the third sample at a fourth point in time within the same mirror period to the third light generation unit, at which fourth point in time the third light generation unit projects, via the pivoting mirror, the third component of the picture element onto an actual third position on the projection area, said actual third position being derived from the actual second position. In other words, for example, the "green" trajectory is considered as the reference trajectory and the "red" and "blue" trajectories are shifted towards the "green" trajectory.

And in analogy to the third embodiment explained above for two colors, said actual first position and said actual second position can be further derived from an estimated third position onto which the third light generation unit would project the third component of the picture element upon receiving the third sample at the first point in time at its input, and the processor can be further configured to output the third sample at a fourth point in time within the same mirror period to the third light generation unit, at which fourth point in time the third light generation unit projects, via the pivoting mirror, the third component of the picture element onto an actual third position on the projection area, said actual third position being derived from the estimated first position, the estimated second position, and the estimated third position. By way of example, a reference trajectory (or simply a reference point) is chosen by calculating a "mean" position towards which the trajectories are shifted, i.e., towards the middle of the "red", "green", and "blue" estimated position.

In an embodiment, at least one of the second and third points in time is determined such that the distance between the actual first and second positions is minimized, i.e., the actual first position and the actual second position are derived such that they lie as close together as possible. Since, as mentioned above, the trajectories of the first and second light generation unit do not generally coincide, also the actual first and second positions do not coincide. Thus, by matching the first and second positions as closely as possible, the picture elements can be displayed as sharp as possible.

In a further embodiment, the actual first position and the actual second position are derived such that they lie on a line which is substantially parallel to one of the axes about which the mirror pivots. Thus, for example, the components can be projected on a (virtual) vertical grid pattern on the projection area. Even though, in general, the first and second actual position will still not match globally, at least their horizontal distances can be regular.

To compensate for the sine-like movement of the mirror and the non-linear behavior of the trajectory on the projection screen, the second point in time can be shifted by an amount corresponding to an angular velocity of the mirror at the second point in time.

Because the mirror has an especially low velocity on its turning points (extrema of the trajectory), the picture to be displayed will usually become distorted on the "edges" of the picture. To avoid this problem, the first sample is not projected by the first light generation unit if the angular velocity of the mirror at the second point in time is below a threshold. This results in the edges of the projected picture being "cut off", i.e., the projected picture is not blurred on its edges.

To achieve an especially dense picture on the projection area, the mirror is optionally a MEMS mirror. MEMS mirrors can be driven to pivot about two axes, e.g., resonant about a first axis and non-resonant about a second axis, to "sweep" the projection area in a line-like manner. This simplifies the control and calibration as described considerably.

The concept of the invention works for all kinds of light projection devices. Two embodiments are described in the following. In a first variant of the invention, the light generation units are configured to emit light beams which are substantially parallel to each other and strike the mirror at mutual distances. This is especially advantageous since the mutual displacement of the components on the projection area can be compensated by the time-shifting scheme according to the invention. Furthermore, beam combiners between the light generation units and the mirror can be avoided.

In a second, alternative variant of the invention, the light generation units are configured to emit light beams which substantially cross at the mirror. This is especially advantageous since the size of the pivoting reflective surface can be minimized, which increases the resonance frequencies of the mirror and hence the resolution of the projected image.

In a further embodiment of the invention, the processor can be configured to interpolate an intensity of the first sample based on the estimated second position between the original intensity of the first sample and an intensity of the further sample. This constitutes a further calibration technique and accounts for the issue that generally the trajectory of neither light generation unit exactly matches the target reference trajectory. By way of example, the intensity of the "red" component should be high on the reference position and low at a neighboring reference position. However, the "red" component actually strikes the projection screen between these reference positions and is thus interpolated between the intense and the light intensity values. Again, the reference position is dependent on the (estimated or actual) position of, e.g., the "green" component.

Said interpolated intensity can in particular be given by $$I_{i,new} = I_i = \frac{d_j}{d_i + d_j} + I_j \frac{d_i}{d_i + d_j},$$

wherein $I_i$ is the original intensity of the first sample, $I_j$ is an intensity of the further sample, $d_i$ is a distance between the first actual position and a reference position derived from the estimated second position, and $d_j$ is a distance between the first actual position and a further reference position corresponding to the further sample.

This linear interpolation is especially useful when the actual first positions and the actual second position lie on a vertical grid pattern since no horizontal displacement has to be corrected. Also, even in general cases it gives a quick interpolation between the sample's own intensity and the intensity of, e.g., the nearest sample. The above-stated formula thus interpolates the intensity of the first sample based on its distance to the reference point above it and below it. One of these reference points corresponds to the position where the component should actually be, and the other reference point corresponds to a position where another (neighboring) component should be.

In an alternative embodiment, the interpolated intensity is obtained by means of an irregular bilinear interpolation using the original intensity of the first sample and intensities corresponding to three further samples. This interpolation accounts for cases in which the component is projected generally between two reference trajectories and thus adjusts the intensity of the sample based on its original intensity and on the intensity of three further (neighboring) samples.

All above-mentioned mappings between a point in time at which a sample is received by the processor and a point in time at which a sample is output by the processor can be stored in a memory connected to the processor, e.g., in form of functions or tables, and the processor uses said mappings, i.e., accesses said memory, when outputting said samples.

In a further aspect of the invention, a method for setting-up said mapping function or table by means of a calibration run is disclosed. In this calibration run, an auxiliary table of points in time and corresponding estimated positions is created on the basis of which the above-mentioned function or table mapping first points in time to second points in time (or third or fourth points in time) can be set up.

To this end, the processor is configured to, before it starts its actual operation as defined above, output—as said "calibration run"—several first and second samples at points in time which are distributed over one whole mirror period to the first and second light generation unit, respectively, and store the positions onto which the light generation units project the corresponding components as said estimated first and second positions, together with each corresponding output time with respect to the mirror period, in the memory, yielding said auxiliary table. The auxiliary table can then be used to find the nearest matching positions of different trajectories, or a trajectory and the predetermined reference trajectory, respectively, from the corresponding times, of which nearest matching positions the final time mapping function or table can then be set-up and stored in the memory for access by the processor during operation.

The invention also provides for a projection device which can re-calibrate said auxiliary table. This is especially useful since the calibration can be done, e.g., on a calibration screen at a close distance to the projection device, whereas the actual projection would be performed onto a different screen in a different distance to the projection device, without having to re-perform said calibration run to set up the auxiliary table.

To this end, the processor is further configured to calculate new estimated first and second positions according to $$x_{d2} = x_{d1}\frac{d_2}{d_1} + \tilde{x}\left(1 - \frac{d_2}{d_1}\right)$$

and $$y_{d2} = y_{d1}\frac{d_2}{d_1} + \tilde{y}\left(1 - \frac{d_2}{d_1}\right),$$

wherein $x_{d1}$ is the horizontal component of the stored estimated first or second position;

$y_{d1}$ is the vertical component of the stored estimated first or second position;

$x_{d2}$ is the horizontal component of the new estimated first or second position;

$y_{d2}$ is the vertical component of the new estimated first or second position;

$\tilde{x}$ is a horizontal offset, e.g., between the light generation units;

$\tilde{y}$ is a vertical offset, e.g., between the light generation units;

$d_1$ is the distance at which the projection area was during obtaining the stored estimated first or second position; and $d_2$ is the distance of the projection area at which the new estimated first or second positions are to be projected.

The invention shall now be explained in more detail below on the basis of exemplary embodiments thereof with reference to the accompanying drawings, in which:

BRIEF DESCRIPTION OF THE DRAWINGS

FIGS. 8-12 show calibration schemes for the components of a picture element performed in the apparatus according to the invention;

FIGS. 16 and 17 show an intensity interpolation scheme performed in the apparatus according to the invention.

DETAILED DESCRIPTION

Figure 1:
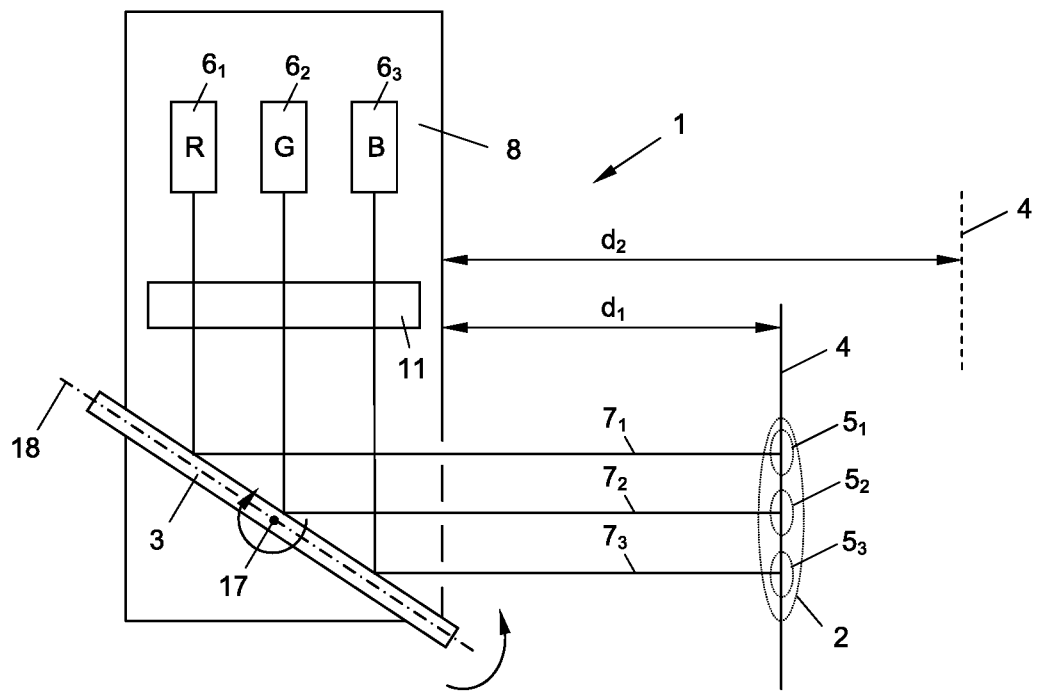
FIG. 1 shows a schematic side view and beam plot of a projection apparatus with three light generation units according to the invention.
Figure 2:
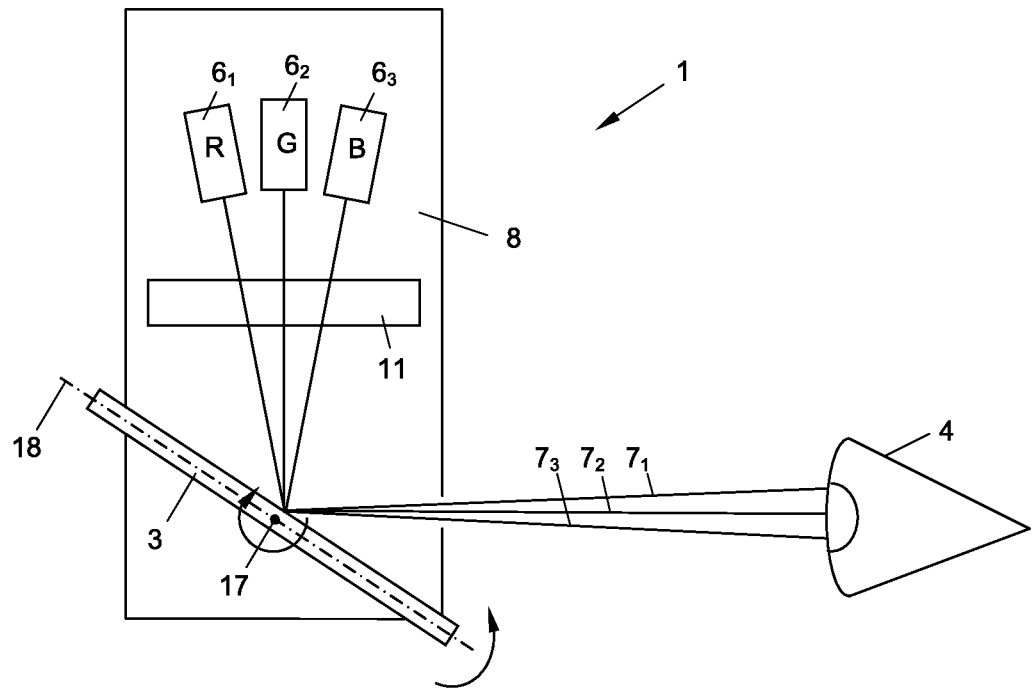
FIG. 2 shows a schematic side view and beam plot of a variant of the projection apparatus of FIG. 1 according to the invention.

FIGS. 1 and 2 show a projection device 1 for projecting a multi-colored light spot, i.e., picture element 2, via a mirror 3 onto a projection area 4, e.g., a screen (FIG. 1) or the human eye (FIG. 2), in a distance $d_1$. The picture element 2 is composed of three individual components $5_1$, $5_2$, $5_3$. To this end, the projection device 1 comprises three light generation units $6_1$, $6_2$, $6_3$—each, e.g., in the form of one and more light emitting diodes (LEDs) or laser diodes—which emit light beams $7_1$, $7_2$, $7_3$ according to the primary colors red (R), green (G), and blue (B). However, the projection device 1 could also only contain two (or more than three) light generation units $6_1$, $6_2$ for purposes other than mixing colors according to the RGB color model, thereby emitting a picture element 2 composed of two (or more) components $5_1$, $5_2$.

The projection device 1 further comprises a carrier 8, onto which the mirror 3 and the light generation units $6_1$, $6_2$, $6_3$ are mounted. Furthermore, an optical element such as a fast axis collimation (FAC) and/or a slow axis collimation (SAC) lens 11 can be mounted on the carrier 8. The carrier 8 can be a single piece or composed of separate elements and can, e.g., include a subcarrier or substrate for mounting the light generation units $6_1$, $6_2$, $6_3$.

According to the embodiment of FIG. 1, the light generation units are configured to emit light beams $7_1$, $7_2$, $7_3$ which are substantially parallel to each other and strike the mirror 3 at mutual distances. If the light beams $7_1$, $7_2$, $7_3$ were to be emitted at same times, this would also cause the components $5_1$, $5_2$, $5_3$ of a single picture element 2 to be projected onto mutually displaced positions on the projection area 4. According to the embodiment of FIG. 2, the light generation units $6_1$, $6_2$, $6_3$ are configured to emit light beams $7_1$, $7_2$, $7_3$ which substantially cross at the mirror 3. Thus, a smaller reflective surface 22 of the mirror 3 can be used, but the components $5_1$, $5_2$, $5_3$ of a single picture element 2 would still be projected onto mutually displaced positions on the projection area 4. Either of the embodiments of FIGS. 1 and 2 can be used to project the picture element 2 onto a projection area 4 in the form of a screen or a human eye.

Figure 3:
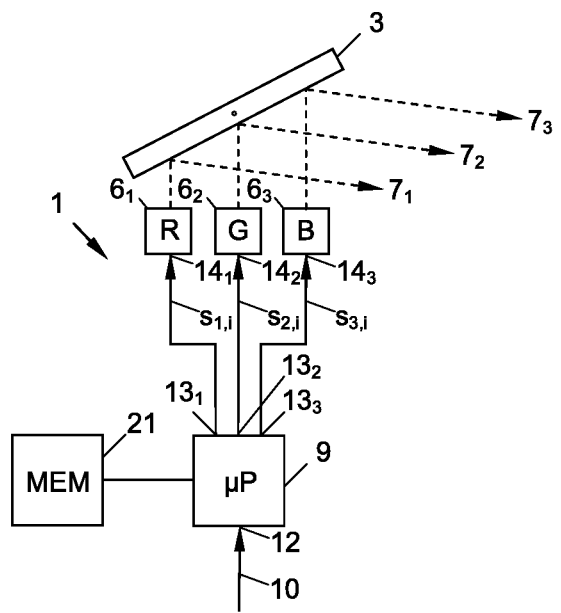
FIG. 3 shows a combined schematic side view, beam plot and block diagram of the projection apparatus according to the invention.

FIG. 3 shows the controlling of the light generation units $6_1$, $6_2$, $6_3$ by means of a processor 9. The processor 9 receives a picture signal 10 at its input 12. The picture signal 10 is composed of a "red" sequence $R_{in}$ of first samples $s_{1,i}$, a "green" sequence $G_{in}$ of second samples $s_{2,i}$, and a "blue" sequence $B_{in}$ of third samples $s_{3,i}$, wherein i=1, 2, . . . denotes the index of time (sample index) within the picture signal 10. Each sample $s_{1,i}$, $s_{2,i}$, $s_{3,i}$ corresponds to one of the components $5_1$, $5_2$, $5_3$ of the picture element 2 at the time $t_i$, called $2_i$, and will thus be denoted by $5_{1,i}$, $5_{2,i}$, $5_{3,i}$ from hereon. As will be explained later in detail, the processor 9 outputs the samples $s_{1,i}$, $s_{2,i}$, $s_{3,i}$ received at its input 12 to outputs $13_1$, $13_2$, $13_3$ connected to corresponding inputs $14_1$, $14_2$, $14_3$ of the three light generation units $6_1$, $6_2$, $6_3$.

Figure 4:
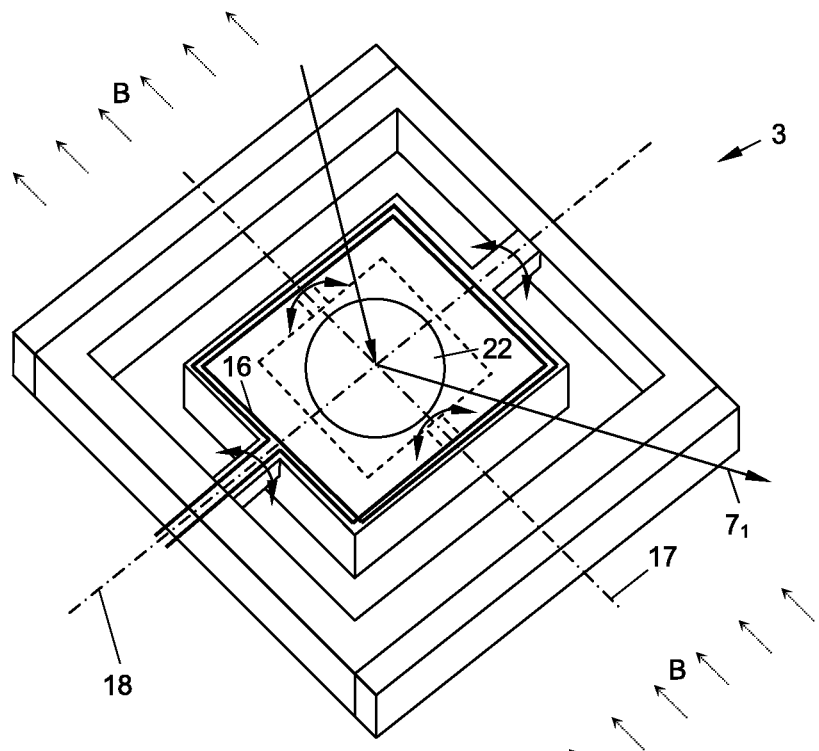
FIG. 4 shows a schematic perspective view of a MEMS mirror pivotable about two axes to be used in the projection apparatus of FIGS. 1-3.

Via the mirror 3, the picture elements $2_i$ are projected across the whole projection area 4. To this end, the mirror 3 is capable of pivoting about two axes 17, 18. FIG. 4 shows such a micro-electro-mechanical system (MEMS) mirror 3. There are various embodiments of the actuation principle of the MEMS mirror 3, e.g., electrostatic, electromagnetic, piezoelectric, electrothermal, or magnetostrictive. In the case of an electromagnetic actuation, by feeding a current to a coil 16 of the mirror 3 lying in a magnetic field B, a movement about the two axes 17, 18 is induced to pivot the mirror plate 22. Thus, the light beam $7_1$ is deflected in varying directions.

Using such a MEMS mirrors 3 allows a fast pivoting movement about the axis 17 if the mirror 3 is driven at a resonance frequency corresponding to the axis 17. Optionally, the mirror 3 is driven at a lower (non-resonant) frequency about the other axis 18 to allow a line-like "scanning" or "sweeping" movement of the light beam $7_1$ over the projection area 4, as will be described below in detail by means of FIG. 5. However, it is also possible to drive the mirror 3 at, e.g., two different resonance frequencies, each corresponding to one of the axes 17, 18. This deflects each of the light beams $7_1$, $7_2$, $7_3$ ($7_1$ being depicted as an example in FIG. 4) to sweep the projection area 4 according to a Lissajous curve. In any case, the least common multiple of the two pivoting periods around the two axes 17, 18 constitutes a mirror period $p_m$, after which the mirror 3 resumes the same alignment as before.

Figure 5:
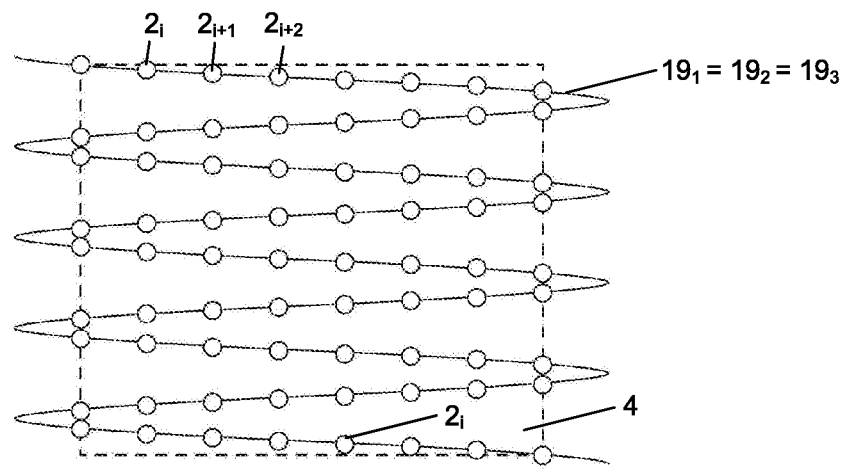
FIG. 5 shows an idealized projection trajectory on a projection area in a schematic view.

FIG. 5 shows an idealized scanning pattern of congruent trajectories $19_1$, $19_2$, $19_3$ on the projection area 4 caused by deflecting each one of the light beams $7_1$, $7_2$, $7_3$ according to the slow and fast axis scheme described above in perfect alignment. Since the processor 9 outputs the samples $s_{1,i}$, $s_{2,i}$, $s_{3,i}$ at successive times i, picture elements $2_i$ of perfectly spatially aligned components $5_{1,i}$, $5_{2,i}$, $5_{3,i}$ are projected at discrete locations along the trajectory $19_1 = 19_2 = 19_3$.

Figure 6:
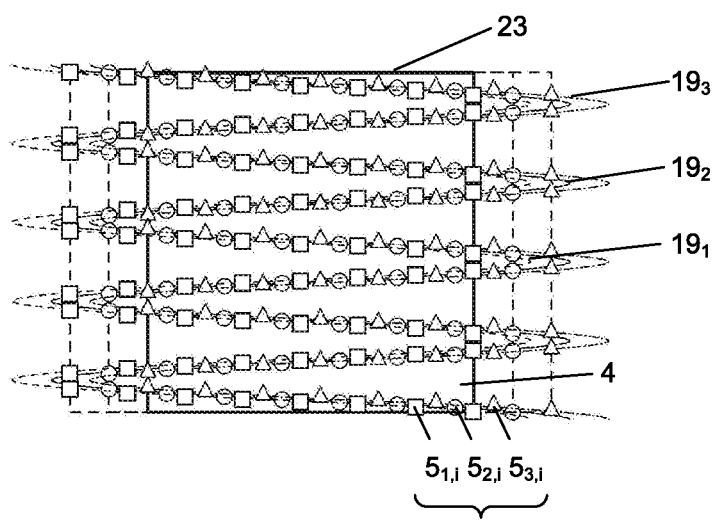
FIG. 6 shows an idealized projection trajectory as projected by the projection apparatus of FIGS. 1-2.

In contrast thereto, FIG. 6 shows a realistic scanning pattern of three non-congruent trajectories $19_1$, $19_2$, $19_3$ on the projection area 4 caused by deflecting the three light beams $7_1$, $7_2$, $7_3$ onto the projection area 4. Due to the mutual displacement of the light generation units $6_1$, $6_2$, $6_3$, also the trajectories $19_1$, $19_2$, $19_3$ are mutually displaced. The components $5_{1,i}$, $5_{2,i}$, $5_{3,i}$ of a single picture element $2_i$ are thus spatially dispersed over different positions $20_{1,i}$, $20_{2,i}$, $20_{3,i}$ (depicted by squares, circles, and triangles, respectively, in the figures), yielding a picture on the projection area 4 which is misaligned or blurred in its color components.

Figure 7:
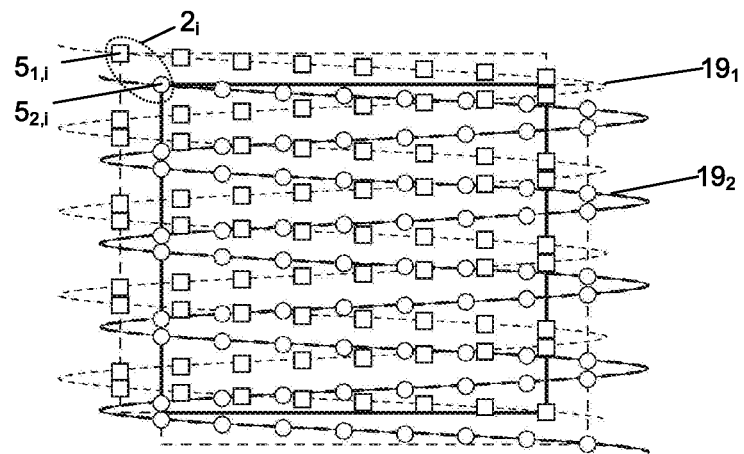
FIG. 7 shows a projection trajectory as projected by two exemplary light generation units of the projection apparatus of FIGS. 1-3.

To simplify the matter at hand, FIG. 7 shows only two trajectories $19_1$, $19_2$ which are mutually displaced both in a horizontal and in a vertical direction; it goes without saying that all explanations given herein for two trajectories and two colors apply mutatis mutandis to the case of three trajectories and three colors.

To compensate for the spatial misalignment of the components $5_{1,i}$, $5_{2,i}$, $5_{3,i}$ within a picture element $2_i$, the processor 9 performs a "time-shifting" or "time-mapping" function on the samples $s_{1,i}$, $s_{2,i}$, $s_{3,i}$ received at its input 12 for outputting them at different instances of time within a mirror period $p_m$ such that the components $5_{1,i}$, $5_{2,i}$, $5_{3,i}$ of a picture element $2_i$ are projected in closer spatial proximity to each other.

Figure 8:
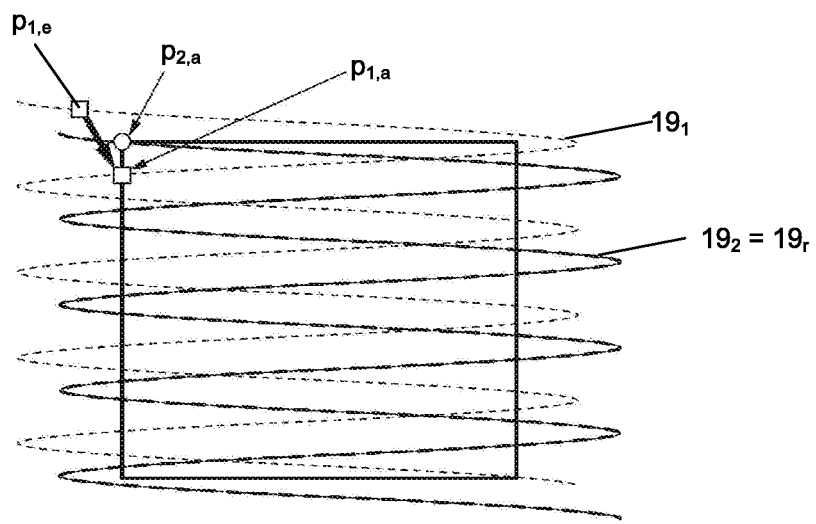

Thus, according to the calibration technique described herein, a "theoretical" or "estimated" reference trajectory $19_r$ is introduced, see FIGS. 8 and 9. In the simplest case, one of the two trajectories $19_1$, $19_2$ is declared as the reference trajectory $19_r$ (trajectory $19_2$ in this example).

In the course of the reference trajectory $19_r$, e.g., a sample $s_{2,i}$ is output to the light generation unit $6_2$ by the processor 9 at the time $t_i$ (also called "first" point in time in the following), whereupon the component $5_{2,i}$ is actually projected onto the position $p_{2,a}$, (also called actual "second" position in the following and serves as a reference position $p_r$ in this case).

On the other hand, in the course of the first trajectory $19_1$, if the processor 9 would output the sample $s_{1,i}$ at the time $t_i$, this would lead to a projection of the component $5_{1,i}$ of the same picture element $2_i$ onto the (misaligned) "theoretical" position $p_{1,e}$, also called "estimated" first position in the following.

Now, to project the first component $5_{1,i}$ in a close proximity to the actual position $p_{2,a}$ of the second component $5_{2,i}$ in order to achieve a well-defined picture element $2_i$, the processor 9 actually outputs the sample $s_{1,i}$—according to its time-shifting function—not at the first time $t_i$, but at another point in time $t_n$ in the course of the trajectory $19_1$, i.e., within the mirror period $p_m$, called "second" point in time $t_n$ in the following, so that the sample $s_{1,i}$ is projected onto the actual first position $p_{1,a}$. Thus, the distance between the actual first and second positions ($p_{1,a}$, $p_{2,a}$) is reduced with respect to the distance between the estimated first and second positions ($p_{1,e}$, $p_{2,e}$).

In the present case where the trajectory $19_2$ is considered as the reference trajectory $19_r$, it can thus be said that the second point in time $t_n$ and therefore the first actual position $p_{1,a}$ are "derived" from the actual second position $p_{2,a}$, (the reference position $p_r$). For clarification, it is noted that in the case where the reference trajectory $19_r$ corresponds to the trajectory $19_2$, the actual second position $p_{2,a}$, is equal to an "estimated" second position $p_{2,e}$.

For performing the time-shifting function $s_{1,i}(t_i) \rightarrow s_{1,i}(t_n)$, the processor 9 can access a corresponding function or table, e.g., when outputting said sample $s_{1,i}$, $s_{2,i}$, $s_{3,i}$, the function or table mapping first points in time $t_i$ to second points in time $t_n$ which can be stored in a memory 21 connected to the processor 9. More precisely, this function or table is a mapping between a point in time $t_i$ at which a sample is received by the processor 9 and a point in time $t_n$, $t_m$, $t_k$ at which a sample is output by the processor 9.

Said function or table can either be generated analytically by means of known mutual displacements or known aging effects or can be generated by means of a calibration run as follows.

In a first step, the processor outputs several first and second samples $s_{1,i}$, $s_{1,i+1}$, $s_{2,i}$, $s_{2,i+1}$ at points in time $t_i$, $t_{i+1}$, ... distributed over one whole mirror period $p_m$ to the first and second light generation unit $6_1$, $6_2$, respectively. Said points in time $t_i$, $t_{i+1}$, ... are optionally spaced at regular intervals which are short enough to obtain a large number of samples over the mirror period. Each output sample will then yield a component $5_{1,i}$, $5_{2,i}$ on the projection area 4 at the distance $d_1$ from the projection device 1. The sum of the projected components thus draws the trajectories $19_1$, $19_2$ on the projection area 4.

In a second step, the processor, or a different entity, stores said positions drawn on the projection area 4, i.e., onto which the light generation units $6_1$, $6_2$ have projected the components $5_{1,i}$, $5_{2,i}$, as estimated first and second positions $p_{1,e}$, $p_{2,e}$, together with each corresponding output time $t_i$, $t_{i+1}$ with respect to the mirror period $p_m$, in the memory 21 in form of an auxiliary function or table. Thus, for each trajectory $19_1$, $19_2$, or light generation unit $6_1$, $6_2$, respectively, said auxiliary table relates estimated positions $p_{1,e}$, $p_{2,e}$ to their corresponding output times $t_i$.

In a third step, the final function or table mapping first points in time $t_i$ to second points in time $t_n$ is created and stored in the memory 21 by the processor 9 using said auxiliary tables. To this end, for example, each estimated first position $p_{1,e}$ of time $t_i$, as retrieved from the auxiliary table, is positionally matched to the nearest estimated second position $p_{2,e}$ (generally: matched to a nearest reference position $p_r$) of time $t_n$, as retrieved from the auxiliary table (generally: as retrieved from a predetermined auxiliary table), which results in a mapping of time $t_1$ to time $t_n$. All time mappings obtained in this way yield a final mapping table or function to be stored in memory 21. It is also possible to interpolate a more precise second point in time $t_n$, e.g., by retrieving two nearest estimated second positions $p_{2,e}$ of times $t_n$, $t_{n+1}$ and taking a (weighted) median of these two times as a new second point in time $t_n$.

Furthermore, it is possible to calibrate the projection device 1 by means of the projection area 4 for a distance $d_1$ and then project a calibrated image onto a projection area 4 at a different distance $d_2$. To this end, the positions in the preliminary table can be re-calculated as "new" estimated first and second positions $p_{1,e}$, $p_{2,e}$ according to $$x_{d2} = x_{d1} \frac{d_2}{d_1} + \tilde{x}\left(1 - \frac{d_2}{d_1}\right)$$

$$y_{d2} = y_{d1} \frac{d_2}{d_1} + \tilde{y}\left(1 - \frac{d_2}{d_1}\right)$$

wherein
$x_{d1}$ is the horizontal component of the stored estimated first or second position $p_{1,e}$, $p_{2,e}$;
$y_{d1}$ is the vertical component of the stored estimated first or second position $p_{1,e}$, $p_{2,e}$;
$x_{d2}$ is the horizontal component of the new estimated first or second position $p_{1,e}$, $p_{2,e}$;
$y_{d2}$ is the vertical component of the new estimated first or second position $p_{1,e}$, $p_{2,e}$;
$\tilde{x}$ is a horizontal offset, e.g., between the light generation units $6_1$, $6_2$;
$\tilde{y}$ is a vertical offset, e.g., between the light generation units $6_1$, $6_2$.

After determining the new estimated first and second positions $p_{1,e}$, $p_{2,e}$ for the distance $d_2$, the final function or table mapping the first points in time $t_i$ to the second points in time $t_n$ can then be freshly created by determining mapping each first estimated position $p_{1,e}$ towards the respective estimated second position $p_{2,e}$.

It is understood that the described calibration techniques can be performed for the third light generation unit $6_3$ and by means of the reference trajectory $19_r$ technique, too.

In a further embodiment, depicted in FIG. 10, the reference trajectory $19_r$ can be chosen as a (e.g., weighted) mean trajectory lying between the trajectories $19_1$ and $19_2$, and the reference position $p_r$ is chosed as a (e.g., weighted) mean position lying between the estimated first and second positions $p_{1,e}$ and $p_{2,e}$. In this case, from the viewpoint of the first light generation unit $6_1$, each "second" (shifted) time $t_n$ is dependent on both the estimated second position $p_{2,e}$ and the estimated first position $p_{1,e}$, i.e., on the (mean) reference trajectory $19_r$.

Much in the same way, from the viewpoint of the second light generation unit $6_2$, the above time-shifting can be performed by the processor 9 mutatis mutandis. That is, the processor 9 outputs the second sample $s_{2,i}$ at a "third" point in time $t_m$ within the same mirror period $p_m$ to the second light generation unit $6_2$, at which third point in time $t_m$ the second light generation unit $6_2$ projects, via the pivoting mirror 3, its second component $5_{2,i}$ of the picture element $2_i$ onto the "actual" second position $p_{2,a}$ on the projection area 4. In other words, it can be said that the actual second position $p_{2,a}$ is "derived" from the estimated second position $p_{2,e}$ and the estimated first position $p_{1,e}$, i.e., from the (mean) reference trajectory $19_r$.

In a more general case, depicted in FIG. 11, the reference trajectory $19_r$ can be predetermined, i.e., not dependent on the estimated first and second positions $p_{1,e}$, $p_{2,e}$. The reference trajectories $19_r$ can, for example, be chosen to be formed by straight parallel lines, such that the reference positions $p_r$ cover the projection area 4 in a regular pattern.

FIG. 12 shows the application of the described calibration scheme to all three light generation units $6_1$, $6_2$, $6_3$. Again, either one of the trajectories $19_1$, $19_2$, $19_3$ can be considered as the reference trajectory $19_r$ or, e.g., a mean reference trajectory $19_r$ is taken, whereupon the actual positions $p_{1,a}$, $p_{2,a}$, $p_{3,a}$ of the components $5_{1,i}$, $5_{2,i}$, $5_{3,i}$ stemming from the samples $s_{1,i}$, $s_{2,i}$, $s_{3,i}$ at output times $t_n$, $t_m$, $t_k$ are each derived from the estimated positions $p_{1,e}$, $p_{2,e}$, $p_{3,e}$ at their common input time $t_i$, i.e., from the (mean) reference trajectory $19_r$. Again, the corresponding function/s or table/s can be stored in the memory 21.

Figure 13A:
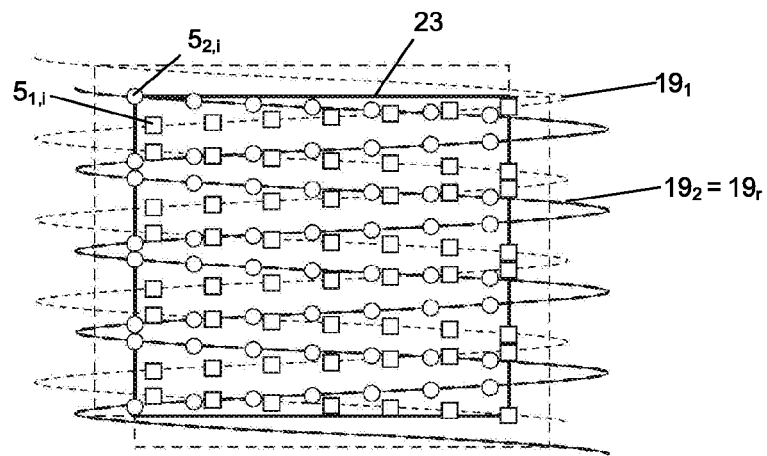
FIGS. 13a and 13b show calibrated projection trajectories on a projection area in a schematic view.
Figure 14A:
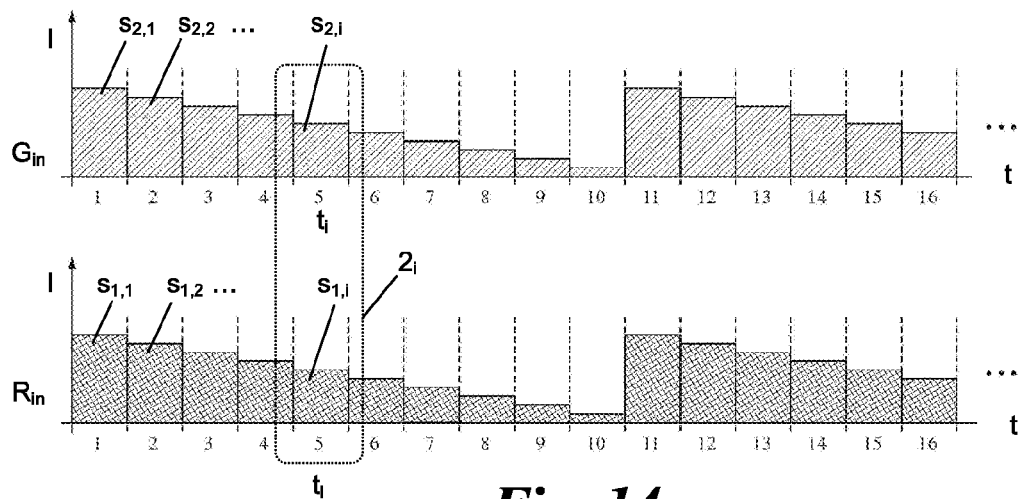
FIGS. 14a, 14b, 15a, 15b show signal timing sequences for the samples before (FIGS. 14a, 14b) and after (FIGS. 15a, 15b) the time-shift calibration, respectively.

FIG. 13a shows the projection screen 4, onto which the first components $5_{1,i}$ have been projected in a calibrated manner as described, wherein the second components $5_{2,i}$ have been declared reference points on the reference trajectory $19_r$. FIG. 14a shows the corresponding samples $s_{1,i}$, $s_{2,i}$ of the input picture signal 10 in the two component channels $G_{in}$ and $R_{in}$ for the color components "green" and "red". To emphasize the mapping, successive incoming samples $s_{1,i}$, $s_{2,i}$ have different intensities $I_{1,i}$, $I_{2,i}$. For example, this could be used for a test signal used for the calibration technique described above.

Figure 15A:
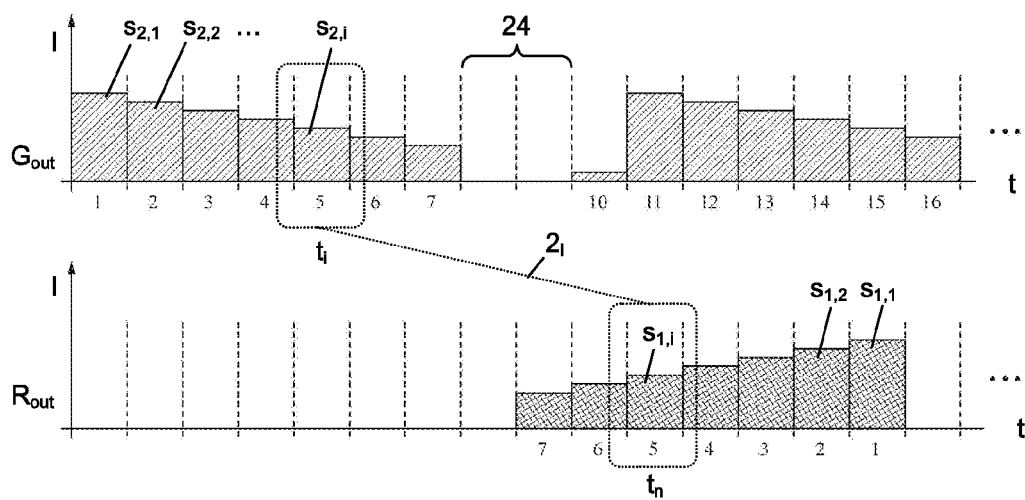
Figure 13B:
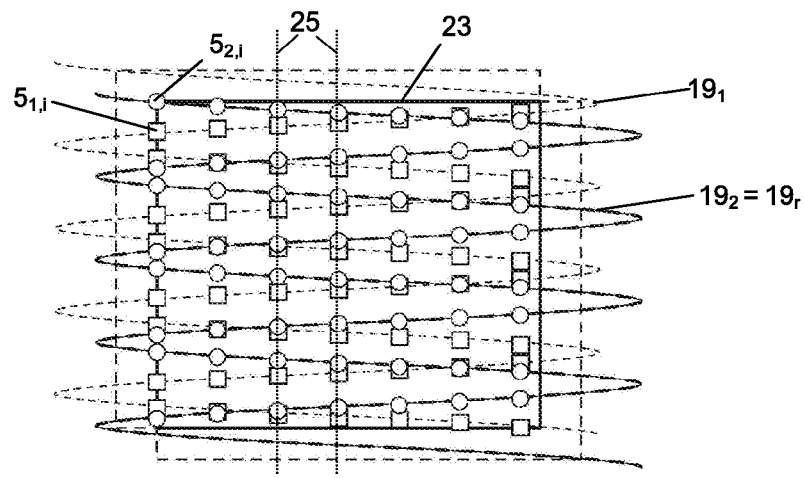
Figure 14B:
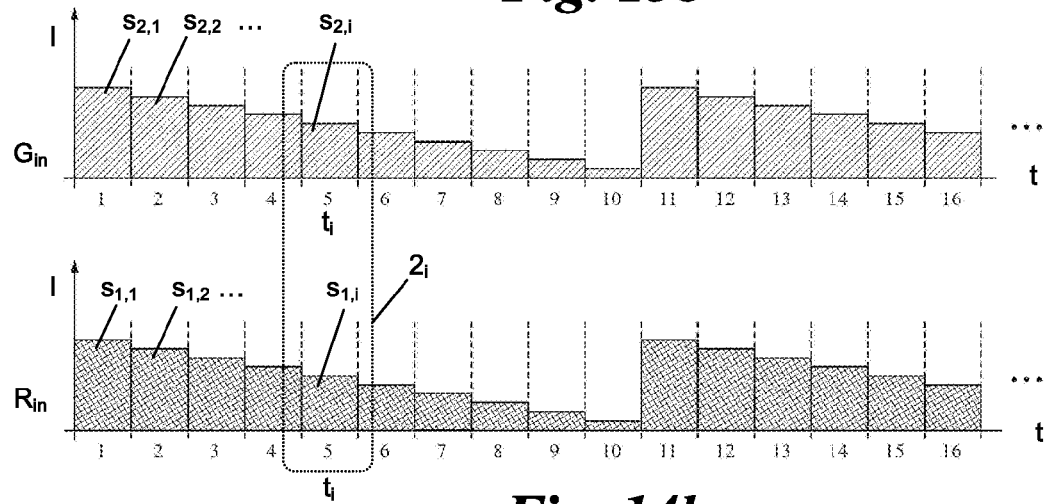
Figure 15B:
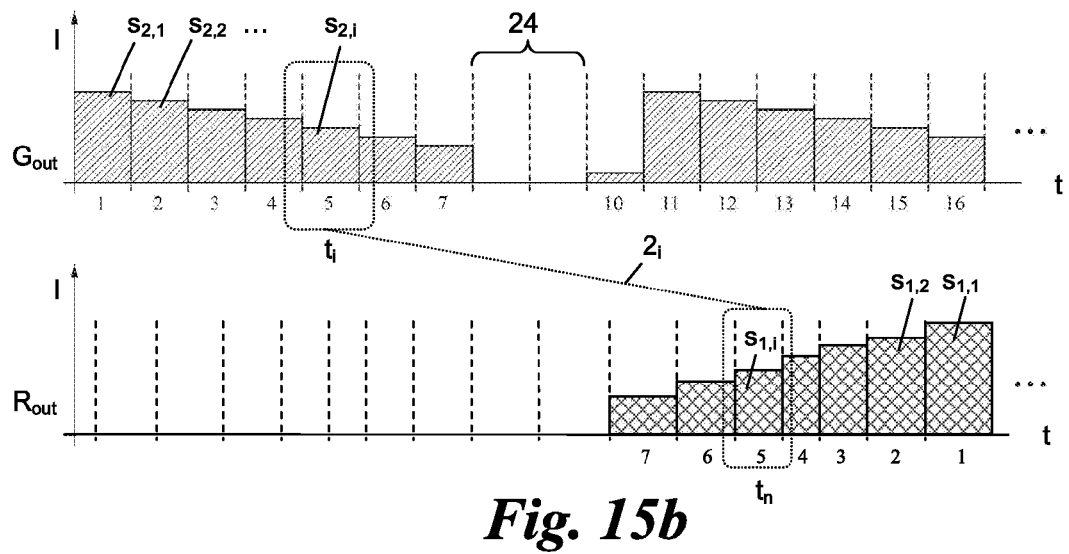

FIG. 15a shows the mapped samples $s_{1,i}$, $s_{2,i}$ appearing at the outputs $13_1$, $13_2$ of the processor 9, i.e., after the time-shifting function, for the two component channels $G_{out}$ ("green") and $R_{out}$ ("red"). It can be seen that, e.g., sample $s_{1,i}$ at input time $t_i$ has been shifted to the output time $t_n$ and there spatially forms the picture element $2_i$ with closer proximity of the components $5_{1,i}$ and $5_{2,i}$.

Furthermore, from FIG. 15a it can be seen that samples $s_{1,i}$, $s_{2,i}$ at the "edge" of the projection area 4 can be deleted, see the exemplary gap 24 in the upper diagram of FIG. 15a. The first reason for this is that the angular velocity of the mirror 3 becomes too slow at its turning-points, such that the components $5_{1,i}$, $5_{2,1}$ cannot be projected accurately enough. The second reason is that due to the mutual displacement there may be no overlap at all of the trajectories $19_1$, $19_2$ in the edge area. To account for both cases, a first sample $s_{1,i}$ and/or a second sample $s_{2,i}$ is not projected by the respective light generation unit $6_1$, $6_2$ if the angular velocity of the mirror 3 at the second (output) points in time $t_n$, $t_m$ is below a given threshold. Only components $5_{1,i}$, $5_{2,i}$ within the frame 23 on the projection area 4 are thus actually projected.

From FIGS. 14a and 15a it can be seen that the times $t_i$, $t_n$ have been considered as "regularly discrete", i.e., at regular intervals, so far. This results in actual first positions $p_{1,a}$ and actual second position $p_{2,a}$ as shown in FIG. 13a. Contrary to that, FIGS. 13b-15b show a variant of the described calibration scheme wherein the actual first positions $p_{1,a}$ and the actual second positions $p_{2,a}$ were derived such that they lie on lines 25 which are substantially parallel to one of the axes 17, 18 about which the mirror 3 pivots. To this end, the intervals between the output times $t_n$ can be chosen to be irregular. In particular, second points in time $t_n$ of a sample $s_{1,i}$ are shifted by an amount corresponding to an angular velocity of the mirror 3 at the second point in time $t_n$. By means of this, the non-linear, sine-like movement of the mirror 3 can be compensated and a perfect alignment along regularly spaced lines 25 (FIG. 13b) can be achieved.

Again, components $5_{1,i}$, $5_{2,i}$ could be skipped to account for the edge of the projection area 4. Alternatively, all components $5_{1,i}$, $5_{2,i}$ could be "squeezed" such that they all fit within the defined frame 23 on the projection area 4. The frame 23 can be chosen so that the angular velocity of the mirror 3 within the frame 23 is always above a given threshold.

FIGS. 16 and 17 show a further calibration technique performed with time-shifted components $5_{1,i}$ as described above. As can be seen from FIG. 13a, even though the first components $5_{1,i}$ have been adjusted towards the second components $5_{2,i}$ serving as reference points, there may still be an offset between them. In other words, a component $5_{1,i}$ should be at its reference position $p_{r,i}$ (in this case the actual second position $p_{2,a}$, in general a position derived from at least the estimated second position $p_{2,e}$). Thus, the intensity $I_i$ carried by the sample $s_{1,i}$ should actually occur at the reference position $p_{r,i}$. To achieve this aim, the intensity $I_{i,new}$ of the sample $s_{1,i}$ is interpolated between its original intensity $I_i$ corresponding to its reference position $p_{r,i}$ and an intensity $I_j$ which should occur at a neighboring reference position $p_{r,j}$. The latter intensity $I_j$ is carried by a sample $s_{1,j}$ ($j \neq i$) which should be at the reference position $p_{r,j}$. The intensities $I_i$, $I_j$ should be weighted by the corresponding distances, whereupon the intensity $I_{i,new}$ of the sample $s_{1,i}$ can be calculated by means of a linear interpolation, e.g., by $$I_{i,new} = I_i = \frac{d_j}{d_i + d_j} + I_j \frac{d_i}{d_i + d_j}$$

wherein $I_i$ is the original intensity of the first sample $s_{1,i}$, $I_j$ is an intensity of the further sample $s_{i,j}$, $d_i$ is a distance between the first actual position $p_{1,a}$ and a reference position $p_{r,i}$ derived from the estimated second position $p_{2,e}$, and $d_j$ is a distance between the first actual position $p_{1,a}$ and a further reference position $p_{r,j}$ corresponding to the further sample $s_{1,j}$.

FIG. 17 corresponds to the calibration scheme of FIG. 13a. The same principles as described above apply, but this time there is also an offset in the horizontal direction. To this end, two more intensities $I_o$, $I_p$ can be considered to perform a so-called irregular bilinear interpolation, which accounts for components $5_{1,i}$, $5_{2,i}$ forming a non-regular pattern on the projection area 4. To this end, a weighted average is determined by means of a distance $d_i$ between the first actual position $p_{1,a}$ and a reference position $p_{r,i}$ derived from the estimated second position $p_{2,e}$, and distances $d_j$, $d_o$, $d_p$ between the first actual position $p_{1,a}$ and three further reference positions $p_{r,j}$, $p_{r,o}$, $p_{r,p}$ corresponding to the further samples $s_{1,j}$, $s_{1,o}$, $s_{1,p}$. To simplify the matter, in a first approximation a bilinear interpolation or any other interpolation whose mathematical outline is known in the state of the art can be performed, possibly also using the weighted average of more than four intensities.

The invention is not restricted to the specific embodiments described in detail herein, but encompasses all variants, combinations and modifications thereof that fall within the framework of the appended claims.

What is claimed is:

1. An apparatus for projecting a picture element composed of at least a first component based on a first sample of a picture signal and a second component based on a second sample of the picture signal, the apparatus comprising:
   a carrier;
   a mirror mounted on the carrier, being configured to pivot about two axes, and having a mirror period;

at least a first and a second light generation unit, each light generation unit being mounted on the carrier, directed at the mirror, and having an input via which it can be controlled; and a processor having an input and a plurality of outputs, wherein each output is connected to one of the inputs of the light generation units;

the processor being configured to receive, at its input, the first sample and the second sample at a first point in time within the mirror period, output the first sample at a second point in time within the same mirror period to the first light generation unit, at which second point in time the first light generation unit projects, via the pivoting mirror, the first component of the picture element onto an actual first position on a projection area, output the second sample at a third point in time within the same mirror period to the second light generation unit, at which third point in time the second light generation unit projects, via the pivoting mirror, the second component of the picture element onto an actual second position on the projection area;

wherein at least one of the second and third points in time is determined such that the distance between the actual first and second positions is reduced; and wherein said actual first and second positions are derived from both an estimated second position onto which the second light generation unit would project the second component of the picture element upon receiving the second sample at the first point in time at its input and from an estimated first position onto which the first light generation unit would project the first component of the picture element upon receiving the first sample at the first point in time at its input.

2. The apparatus according to claim 1, wherein said actual first and second positions are derived from a reference position lying on a reference trajectory.

3. The apparatus according to claim 1, wherein the third point in time corresponds to the first point in time; and wherein said actual first position is derived from the actual second position.

4. The apparatus according to claim 1 for projecting a picture element composed of the first component, the second component, and a third component based on a third sample of the picture signal, the apparatus comprising three light generation units corresponding to different colors, wherein the processor is further configured to output the third sample at a fourth point in time within the same mirror period to the third light generation unit, at which fourth point in time the third light generation unit projects, via the pivoting mirror, the third component of the picture element onto an actual third position on the projection area;

wherein the fourth point in time is determined such that the distance between the actual first and third positions and the distance between the actual second and third positions are reduced.

5. The apparatus according to claim 1, wherein at least one of the second and third points in time is determined such that the distance between the actual first and second positions is minimized.

6. The apparatus according to claim 2, wherein the actual first position and the actual second position are derived such that they lie on a line which is substantially parallel to one of the axes about which the mirror pivots.

7. The apparatus according to claim 1, wherein the second point in time is shifted by an amount corresponding to an angular velocity of the mirror at the second point in time.

8. An apparatus for projecting a picture element composed of at least a first component based on a first sample of a picture signal and a second component based on a second sample of the picture signal, the apparatus comprising:

a carrier;

a mirror mounted on the carrier, being configured to pivot about two axes, and having a mirror period;

at least a first and a second light generation unit, each light generation unit being mounted on the carrier, directed at the mirror, and having an input via which it can be controlled; and a processor having an input and a plurality of outputs, wherein each output is connected to one of the inputs of the light generation units;

the processor being configured to receive, at its input, the first sample and the second sample at a first point in time within the mirror period, output the first sample at a second point in time within the same mirror period to the first light generation unit, at which second point in time the first light generation unit projects, via the pivoting mirror, the first component of the picture element onto an actual first position on a projection area, output the second sample at a third point in time within the same mirror period to the second light generation unit, at which third point in time the second light generation unit projects, via the pivoting mirror, the second component of the picture element onto an actual second position on the projection area;

wherein at least one of the second and third points in time is determined such that the distance between the actual first and second positions is reduced; and wherein the first sample is not projected by the first light generation unit if the angular velocity of the mirror at the second point in time is below a threshold.

9. The apparatus according to claim 1, wherein the processor is further configured to interpolate an intensity of the first sample based on the estimated second position between the original intensity of the first sample and an intensity of a further sample.

10. The apparatus according to claim 9, wherein the interpolated intensity is given by $$I_{i,new} = I_i = \frac{d_j}{d_i + d_j} + I_j \frac{d_i}{d_i + d_j},$$

wherein $I_i$ is the original intensity of the first sample, $I_j$ is an intensity of the further sample, $d_i$ is a distance between the first actual position and a reference position derived from the estimated second position, and $d_j$ is a distance between the first actual position and a further reference position corresponding to the further sample.

11. The apparatus according to claim 9, wherein the interpolated intensity is obtained by means of an irregular bilinear interpolation using the original intensity of the first sample and intensities corresponding to three further samples.

12. The apparatus according to claim 1, wherein a mapping between a point in time at which a sample is received by the processor and a point in time at which a sample is output by the processor, is stored in a memory connected to the processor, and wherein the processor uses said mapping when outputting said sample.

13. The apparatus according to claim 1, wherein the processor is configured to,
before the processor receives the first sample at the first point in time,
output two or more first and second samples at points in time distributed over one whole mirror period to the first and second light generation unit, respectively, and
store the positions onto which the light generation units project the corresponding components as said estimated first and second positions, together with each corresponding output time with respect to the mirror period, in the memory.

14. An apparatus for projecting a picture element composed of at least a first component based on a first sample of a picture signal and a second component based on a second sample of the picture signal, the apparatus comprising:
a carrier;
a mirror mounted on the carrier, being configured to pivot about two axes, and having a mirror period;
at least a first and a second light generation unit, each light generation unit being mounted on the carrier, directed at the mirror, and having an input via which it can be controlled; and
a processor having an input and a plurality of outputs, wherein each output is connected to one of the inputs of the light generation units;
the processor being configured to
receive, at its input, the first sample and the second sample at a first point in time within the mirror period,
output the first sample at a second point in time within the same mirror period to the first light generation unit, at which second point in time the first light generation unit projects, via the pivoting mirror, the first component of the picture element onto an actual first position on a projection area,
output the second sample at a third point in time within the same mirror period to the second light generation unit, at which third point in time the second light generation unit projects, via the pivoting mirror, the second component of the picture element onto an actual second position on the projection area;
wherein at least one of the second and third points in time is determined such that the distance between the actual first and second positions is reduced;
wherein the processor is configured to,
before the processor receives the first sample at the first point in time,
output two or more first and second samples at points in time distributed over one whole mirror period to the first and second light generation unit, respectively, and
store the positions onto which the light generation units project the corresponding components as said estimated first and second positions, together with each corresponding output time with respect to the mirror period, in the memory; and
wherein the processor is configured to calculate new estimated first and second positions according to $$x_{d2} = x_{d1}\frac{d_2}{d_1} + \tilde{x}\left(1 - \frac{d_2}{d_1}\right)$$

and $$y_{d2} = y_{d1}\frac{d_2}{d_1} + \tilde{y}\left(1 - \frac{d_2}{d_1}\right),$$

wherein
$x_{d1}$ is the horizontal component of the stored estimated first or second position;
$y_{d1}$ is the vertical component of the stored estimated first or second position;
$x_{d2}$ is the horizontal component of the new estimated first or second position;
$y_{d2}$ is the vertical component of the new estimated first or second position;
$\tilde{x}$ is a horizontal offset between the light generation units;
$\tilde{y}$ is a vertical offset between the light generation units;
$d_1$ is the distance at which the projection area was during obtaining the stored estimated first or second position; and
$d_2$ is the distance of the projection area at which the new estimated first or second positions are to be projected.

15. The apparatus according to claim 8, wherein said actual first and second positions are derived from a reference position lying on a reference trajectory.

16. The apparatus according to claim 8, wherein the third point in time corresponds to the first point in time; and
wherein said actual first position is derived from the actual second position.

17. The apparatus according to claim 8, wherein said actual first and second positions are derived from both an estimated second position onto which the second light generation unit would project the second component of the picture element upon receiving the second sample at the first point in time at its input and from an estimated first position onto which the first light generation unit would project the first component of the picture element upon receiving the first sample at the first point in time at its input.

18. The apparatus according to claim 8 for projecting a picture element composed of the first component, the second component, and a third component based on a third sample of the picture signal, the apparatus comprising three light generation units corresponding to different colors, wherein the processor is further configured to
output the third sample at a fourth point in time within the same mirror period to the third light generation unit, at which fourth point in time the third light generation unit projects, via the pivoting mirror, the third component of the picture element onto an actual third position on the projection area;
wherein the fourth point in time is determined such that the distance between the actual first and third positions and the distance between the actual second and third positions are reduced.

19. The apparatus according to claim 8, wherein at least one of the second and third points in time is determined such that the distance between the actual first and second positions is minimized.

20. The apparatus according to claim 8, wherein the second point in time is shifted by an amount corresponding to an angular velocity of the mirror at the second point in time.

21. The apparatus according to claim 8, wherein the processor is further configured to interpolate an intensity of the first sample based on the estimated second position between the original intensity of the first sample and an intensity of a further sample.

22. The apparatus according to claim 8, wherein the processor is configured to,
before the processor receives the first sample at the first point in time,
output two or more first and second samples at points in time distributed over one whole mirror period to the first and second light generation unit, respectively, and
store the positions onto which the light generation units project the corresponding components as said estimated first and second positions, together with each corresponding output time with respect to the mirror period, in the memory.

\* \* \* \* \*